(12) United States Patent
Gargiulo

(10) Patent No.: US 8,490,325 B2
(45) Date of Patent: Jul. 23, 2013

(54) FLYING PEST DETERRENT DEVICE

(76) Inventor: Rudy Gregory Gargiulo, Simi Valley, CA (US)

( * ) Notice: Subject to any disclaimer, the term of this patent is extended or adjusted under 35 U.S.C. 154(b) by 853 days.

(21) Appl. No.: 12/576,624

(22) Filed: Oct. 9, 2009

(65) Prior Publication Data

US 2011/0083359 A1 Apr. 14, 2011

(51) Int. Cl.
*A01M 5/02* (2006.01)

(52) U.S. Cl.
USPC ............................ 43/137; 43/132.1; 416/501

(58) Field of Classification Search
USPC .................. 43/137, 132.1; 416/501
See application file for complete search history.

(56) References Cited

U.S. PATENT DOCUMENTS

| | | | | |
|---|---|---|---|---|
| 77,415 A * | 4/1868 | Timon et al. | .................. | 416/205 |
| 191,823 A * | 6/1877 | Baird | ............... | 416/65 |
| 194,369 A * | 8/1877 | Shirley | ............ | 185/37 |
| 288,021 A * | 11/1883 | Cofer | ............ | 416/240 |
| 503,945 A * | 8/1893 | Conard | ............... | 49/58 |
| 1,137,602 A * | 4/1915 | Goddard | .......... | 49/60 |
| 2009/0311446 A1 * | 12/2009 | DeMoor | .......... | 428/4 |

* cited by examiner

*Primary Examiner* — Christopher P Ellis
(74) *Attorney, Agent, or Firm* — John R. Ross; John R. Ross, III

(57) ABSTRACT

A flying pest deterrent device. Streamers are attached to fan blades of an electric fan. The rotary motion of the fan blades creates relative wind causing the streamers to move erratically through the air thereby creating a flying pest deterrent area. In a preferred embodiment the fan is a portable fan creating a flying pest deterrent area over food and the flying pests are flies.

13 Claims, 6 Drawing Sheets

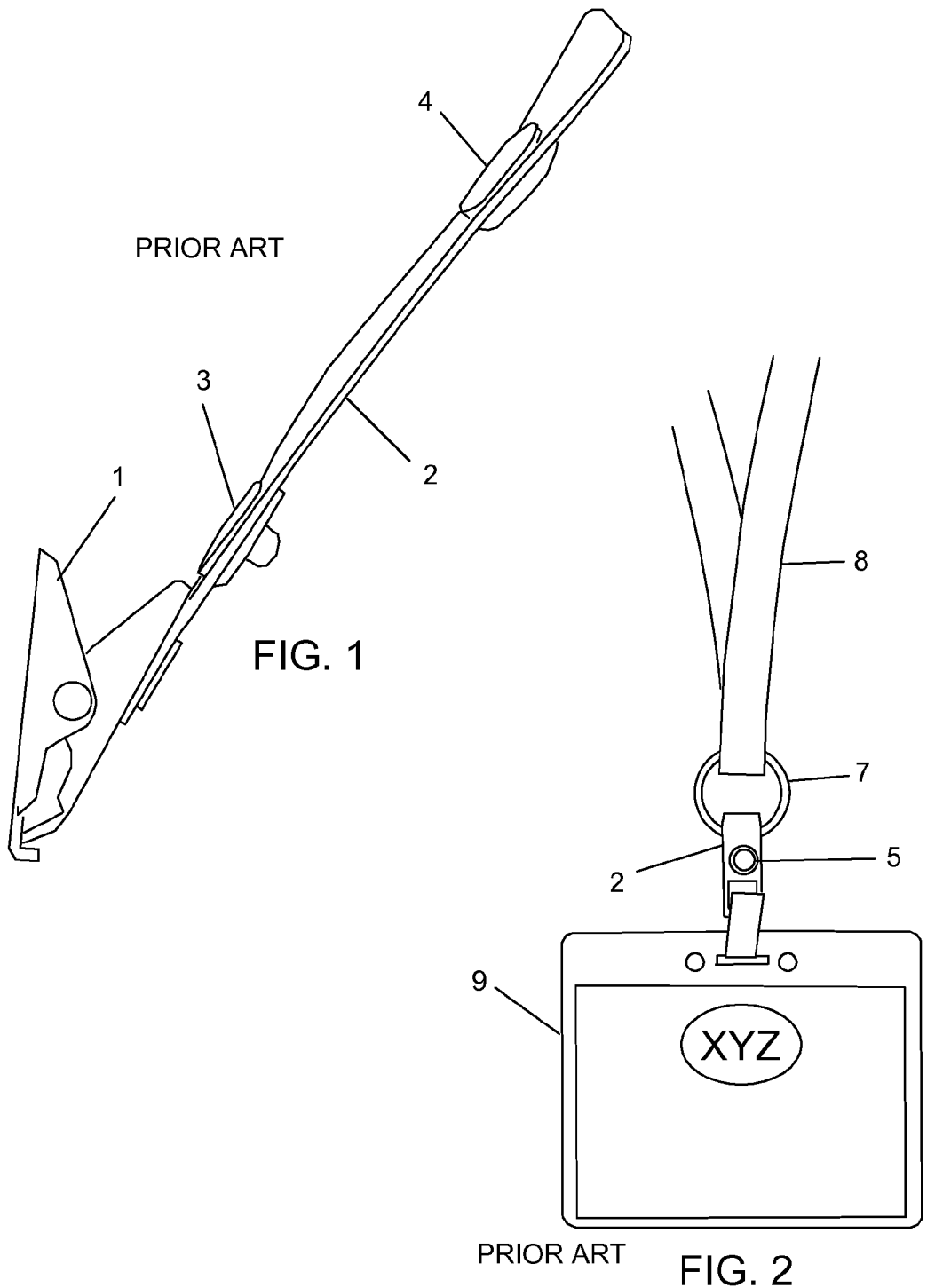

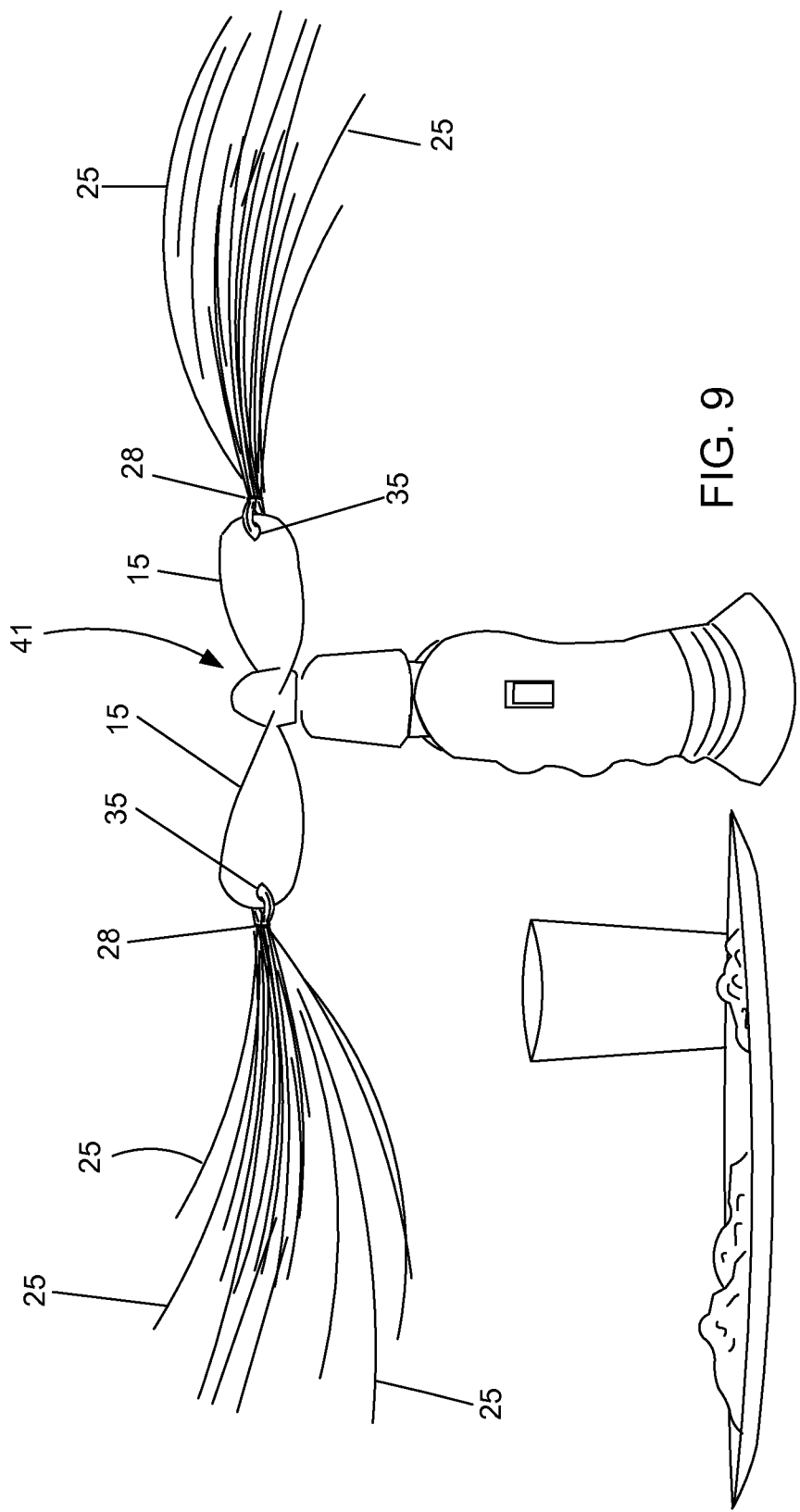

FLYING PEST DETERRENT DEVICE

The present invention relates to deterrent devices for pests, and in particular, to deterrent devices for flying pests.

BACKGROUND OF THE INVENTION

Flying pests, such as flies, have been an unhealthy and irritating nuisance to humans for as long as humans and the flying pests have co-existed. There are currently many devices on the market for dealing with flying pests, such as fly-paper, fly swatters, and even poison. However, none of these devices have completely eliminated the problem.

Prior Art Badge Clip

FIG. 1 shows a prior art badge clip and FIG. 2 shows an example of usage of a prior art badge clip. Spring loaded clip 1 is connected to clear plastic strap 2. Male snap section 3 and female snap section 4 are connected to strap 2. When they are they are snapped together they form snap 5 (FIG. 2). Plastic strap 2 forms a loop which is looped around ring 7. Ring 7 is connected to neck strap 8 and worn around the neck of the person wearing badge 9.

Fans

Fans are very well known and are very common. FIG. 3 shows prior art electrical ceiling fan 9. String 9 is pulled to adjust the rotational speed of fan blades 13. String 11 is used to turn on/off lights 12

FIG. 4 shows a prior art battery operated portable fan 14. Fan blades 15 are pivotally attached to base 17 via arm 18. The angle of blades 15 is adjusted by the user pushing arm 18 to the desired location along slot 16. The fan is turned on/off via switch 19. Portable fan 14 includes a suction base 20 that is used for firmly mounting fan 14 to a non-porous material, such as a glass tabletop.

Bicycle Streamers

Bicycle streamers are well known and are used to decorate the handlebars of a bicycle. FIG. 5 shows prior art bicycle streamer 21. Plastic insertion piece 22 is pushed into the end of a bicycle handlebar grip. Plastic lightweight streamers 25 are inserted through loop 24. Plastic tie 23 is cinched tight around streamers 25. As the bicycle rider rides his bicycle, relative wind is created and streamers 25 fly erratically in the relative wind to create a decorative and pleasing appearance.

What is needed is a better device for deterring unwanted flying pests.

SUMMARY OF THE INVENTION

The present invention provides a flying pest deterrent device. Streamers are attached to fan blades of an electric fan. The rotary motion of the fan blades creates relative wind causing the streamers to move erratically through the air thereby creating a flying pest deterrent area. In a preferred embodiment the fan is a portable fan creating a flying pest deterrent area over food and the flying pests are flies.

BRIEF DESCRIPTION OF THE DRAWINGS

FIGS. 1-5 show prior art devices.
FIG. 9 shows another preferred embodiment of the present invention.

DETAILED DESCRIPTION OF THE PREFERRED EMBODIMENTS

Figure 3:
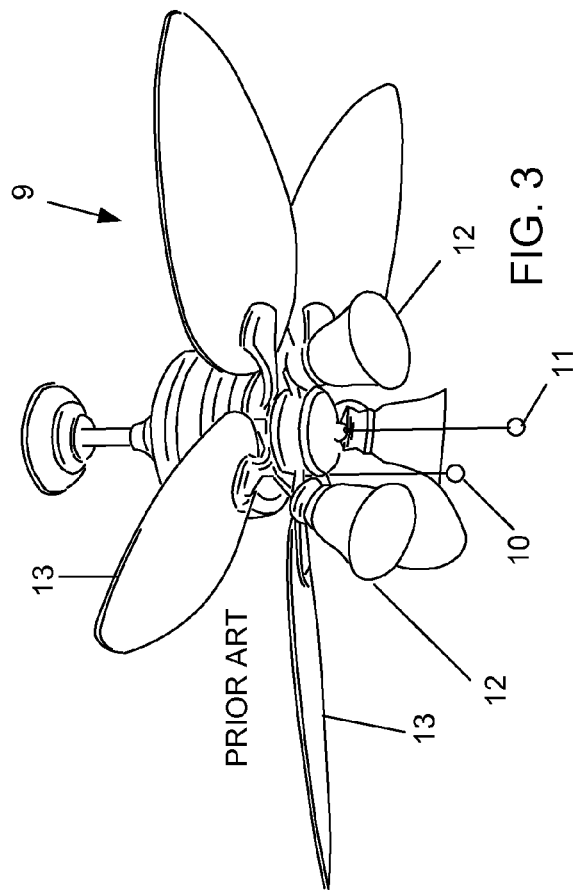
Figure 5:
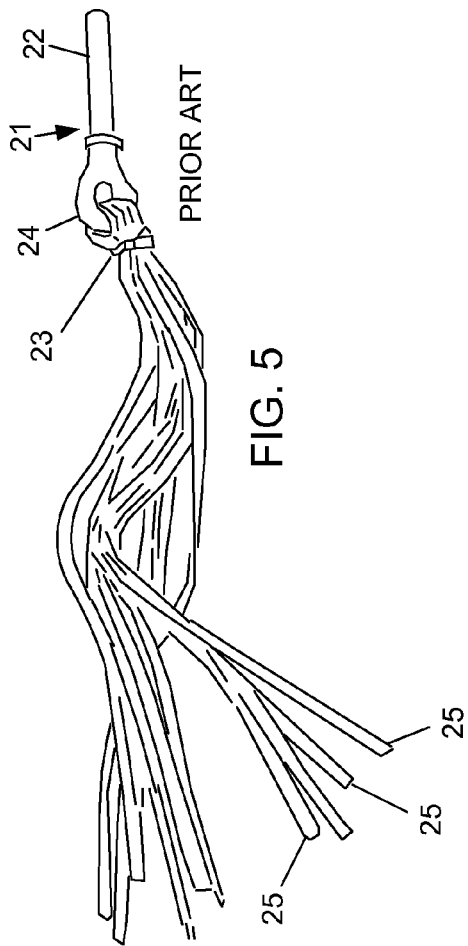
Figure 4:
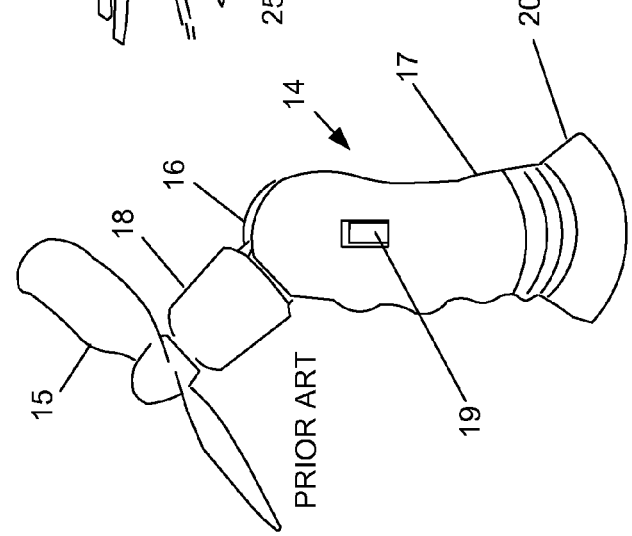
Figure 6:
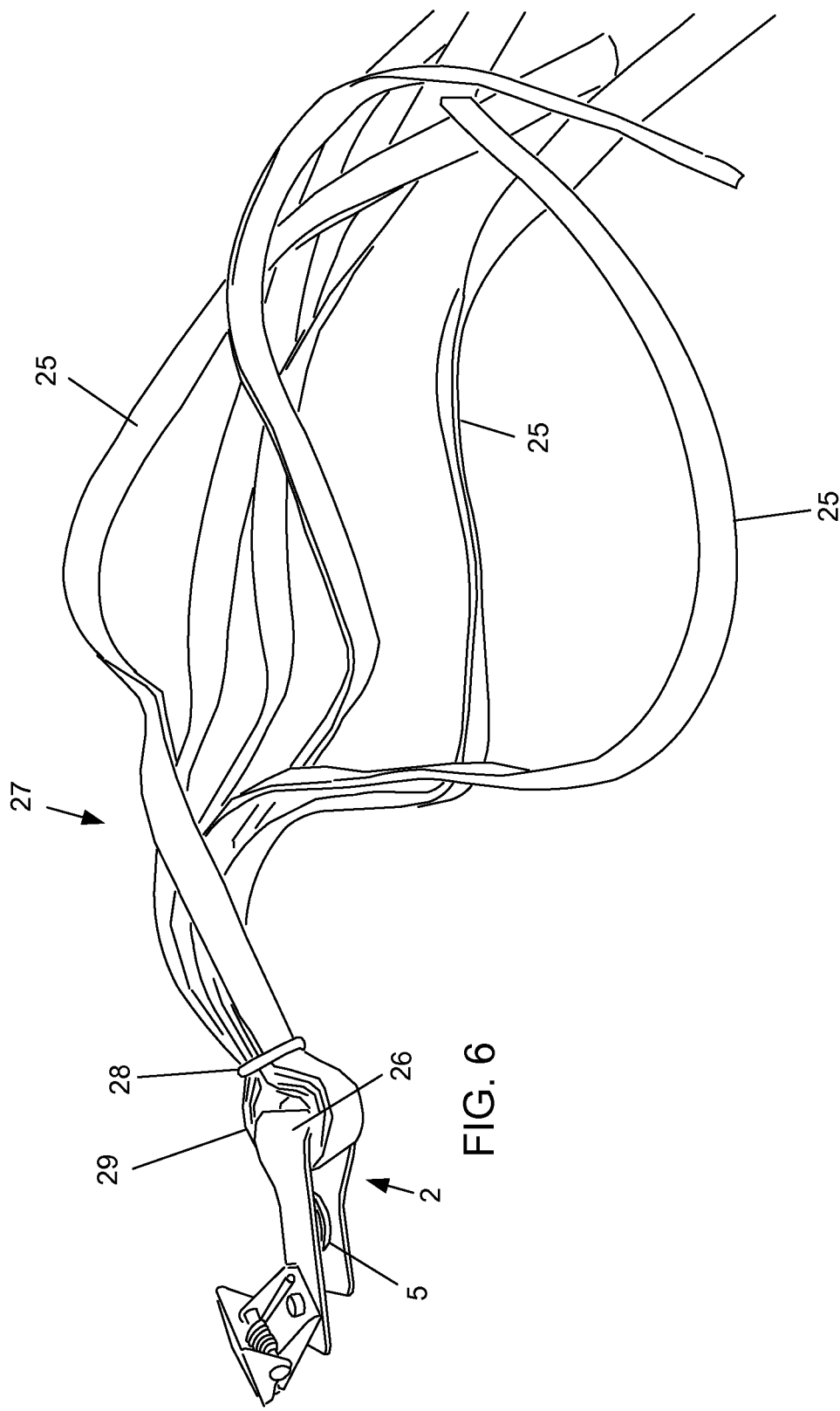
FIG. 6 shows a preferred streamer assembly.

FIG. 6 shows preferred streamer assembly 27. O-ring 28 is cinched tight around streamers 25 to form loop 29. Plastic strap 2 is run through loop 29 and snapped at snap 5 to form interlocking loop 26. In one preferred embodiment of the present invention streamers 4 extend approximately 12 inches out from O-ring 28.

Figure 7:
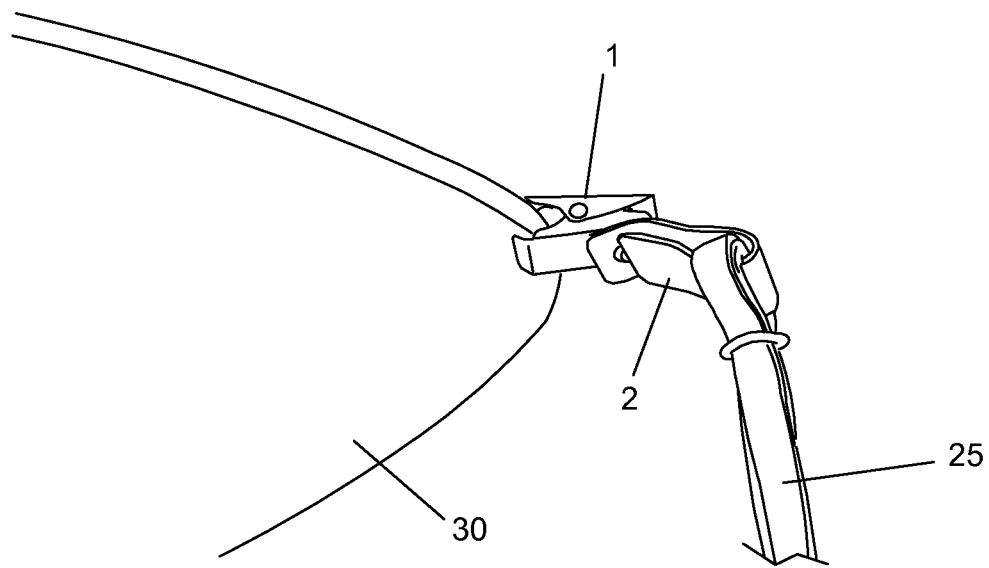
FIG. 7 shows a preferred streamer assembly clipped to a fan blade.
Figure 8:
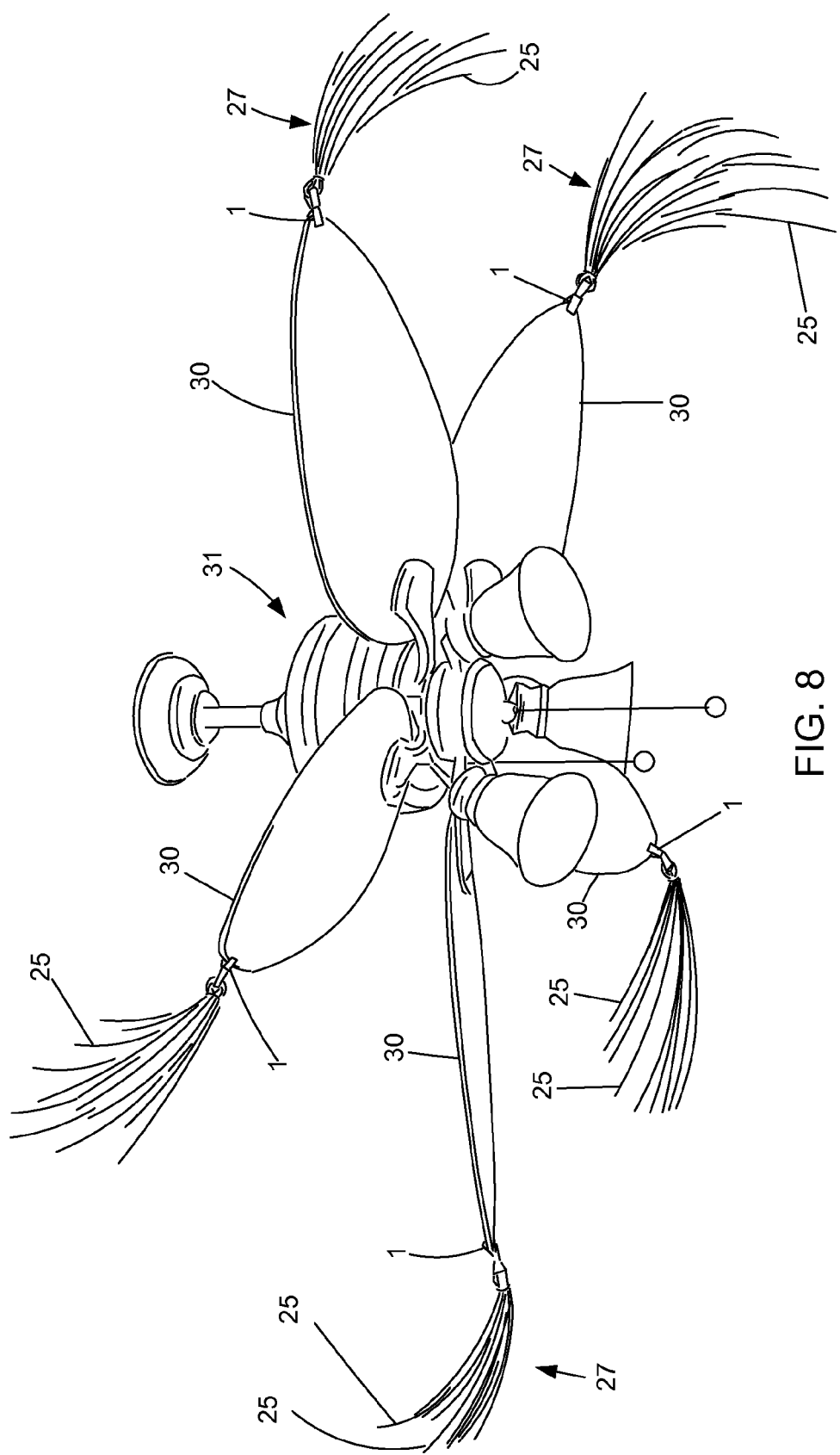
FIG. 8 shows a preferred embodiment of the present invention.

FIG. 7 shows a detailed view of spring loaded clip 1 attached to the end of fan blade 30. FIG. 8 shows a perspective view of streamer assemblies 27 attached to the ends of fan blades 30 while fan 31 is in operation. As fan 31 rotates, relative wind is created. Streamers 25 flow through the air in an erratic fashion. The motion of streamers 25 through the air is creates an environment that is unattractive to flies and other flying pests (for example, mosquitoes). Consequently, the flies and other flying pests will move to another area that is away from streamers 25.

FIG. 9 shows another preferred embodiment of the present invention. Streamers 25 are attached to blades 15 by threading the streamers through holes 35. Streamers 25 are secured tight against blades 35 by inserting the streamers through O-ring 28 and then tightening O-ring 28 against blades 35 to form a loop as shown. As shown in FIG. 9, portable fan 41 with streamers 25 moving roughly in a horizontal plane can be placed directly over food to prevent flies and other pests from landing on the food.

Streamer Types

It should be noted that streamers 25 can be made from a variety of materials. In general, lighter weight materials (for example, light weight flexible plastic) will move through the air more erratically than heavier materials (for example, leather strips). Flies and other pests tend to avoid the motion of erratic moving streamers more so than the motion of streamers that move with more predictable motion. It should also be noted that extending the length of streamers 25 allows for greater coverage. In a preferred embodiment, streamers 25 extend approximately 24 inches out from O-ring 28.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:
1. A flying pest deterrent device, comprising:
A) an attachment clip,
B) a plurality of streamers attached to said attachment clip, and
C) an electrically powered fan comprising a plurality of fan blades, wherein said attachment clip is removably attached to at least one of said plurality of fan blades, wherein rotary motion of said plurality of fan blades creates relative wind causing said plurality of streamers to move erratically through the air creating a flying pest deterrent area.

2. The flying pest deterrent device as in claim 1, wherein said electrically powered fan is a ceiling fan.

3. The flying pest deterrent device as in claim 1, wherein said electrically powered fan is a portable fan.

4. The flying pest deterrent device as in claim 3, wherein said portable fan comprises a suction base.

5. The flying pest deterrent device as in claim 1, wherein said flying pests are flies.

6. The flying pest deterrent device as in claim 1, wherein said plurality of streamers is a plurality of flexible plastic strips.

7. The flying pest deterrent device as in claim 1, wherein said plurality of streamers is a plurality of leather strips.

8. The flying pest deterrent device as in claim 1, wherein said plurality of streamers is clipped to said at least one of said plurality of fan blades.

9. The flying pest deterrent device as in claim 1, wherein said plurality of streamers is threaded through a hole in said at least one of said plurality of fan blades.

10. The flying pest deterrent device as in claim 1, wherein said flying pest deterrent area encompasses and area containing food, wherein said flying pests are deterred from contacting said food by the erratic motion of said streamers.

11. The flying pest deterrent device as in claim 1, wherein said electrically powered fan is a battery powered hand-held portable fan.

12. The flying pest deterrent device as in claim 1, wherein said electrically powered fan is a plurality of electrically powered fans, wherein said attachment clip is alternatingly removably attached to each of said plurality of electrically powered fans in sequence.

13. The flying pest deterrent device as in claim 1, wherein said attachment clip is spring loaded attachment clip.

* * * * *